US012286980B2

(12) United States Patent
Löcher

(10) Patent No.: US 12,286,980 B2
(45) Date of Patent: Apr. 29, 2025

(54) METHOD FOR HYDRAULICALLY LOWERING TOOLS ONTO A SURFACE OF AN OBJECT

(71) Applicant: Thomas Löcher, Steinberg/OT Wildenau (DE)

(72) Inventor: Thomas Löcher, Steinberg/OT Wildenau (DE)

( * ) Notice: Subject to any disclaimer, the term of this patent is extended or adjusted under 35 U.S.C. 154(b) by 0 days.

(21) Appl. No.: 18/555,271

(22) PCT Filed: Mar. 10, 2022

(86) PCT No.: PCT/EP2022/056186
§ 371 (c)(1),
(2) Date: Oct. 13, 2023

(87) PCT Pub. No.: WO2022/218619
PCT Pub. Date: Oct. 20, 2022

(65) Prior Publication Data

US 2024/0218887 A1 Jul. 4, 2024

(30) Foreign Application Priority Data

Apr. 15, 2021 (DE) ..................... 10 2021 203 713.5

(51) Int. Cl.
*F15B 11/028* (2006.01)
*F15B 11/16* (2006.01)

(52) U.S. Cl.
CPC .......... *F15B 11/028* (2013.01); *F15B 11/165* (2013.01); *F15B 2211/30515* (2013.01);
(Continued)

(58) Field of Classification Search
CPC ............ F15B 11/028; F15B 2211/3056; F15B 2211/30565; E02F 9/2203; E02F 9/2264; E02F 9/2267; E02F 9/226
(Continued)

(56) References Cited

U.S. PATENT DOCUMENTS 3,437,012 A * 4/1969 Ludvig ..................... B66B 1/24
137/596.2
4,318,332 A * 3/1982 Shingu .................. F15B 11/048
91/452
(Continued)

FOREIGN PATENT DOCUMENTS

DE 102004033315 A1 2/2006
DE 102006032599 A1 2/2008
(Continued)

OTHER PUBLICATIONS

European Patent Office, International Search Report and Written Opinion in Application No. PCT/EP2022/056186, dated May 31, 2022, 15 pages, Rijswijk, Netherlands.

*Primary Examiner* — Michael Leslie
(74) *Attorney, Agent, or Firm* — Marshall & Melhorn, LLC

(57) ABSTRACT

Hydraulic fluid is fed to a hydraulic cylinder via a feed line, and the hydraulic cylinder raises and lowers a mechanical device with a tool, where a lowering motion of the tool is reached by closing a second valve. Thereby, a third valve and a first valve are opened so that a first pressure is set between the first valve and the third valve, which corresponds to a pressure in the feed line and the cylinder at which the predetermined pressure or force effect can be exerted with the tool on the surface of the object. When a second pressure in the feed line between the hydraulic cylinder and the second valve is reduced to a value corresponding to the previously reached first pressure, the second valve is opened so that a pressure is maintained in the feed line up to the piston inside the hydraulic cylinder.

10 Claims, 1 Drawing Sheet

(52) U.S. Cl.
CPC . *F15B 2211/5158* (2013.01); *F15B 2211/526* (2013.01); *F15B 2211/6306* (2013.01); *F15B 2211/665* (2013.01); *F15B 2211/76* (2013.01)

(58) Field of Classification Search
USPC .......................................................... 91/448
See application file for complete search history.

(56) References Cited

U.S. PATENT DOCUMENTS

| | | | | | |
|---|---|---|---|---|---|
| 5,460,001 | A * | 10/1995 | Kato | E02F 9/2232 | 91/518 |
| 5,537,819 | A * | 7/1996 | Kobayashi | F15B 11/04 | 60/459 |
| 5,680,762 | A * | 10/1997 | Reid | E02F 9/2221 | 60/494 |
| 7,353,744 | B2 * | 4/2008 | Dixen | F15B 11/05 | 91/446 |
| 8,020,485 | B2 * | 9/2011 | Jessen | E02F 9/2228 | 91/451 |
| 8,033,209 | B2 * | 10/2011 | Jessen | F15B 11/028 | 701/50 |
| 8,230,771 | B2 * | 7/2012 | Bitter | A01D 41/145 | 91/361 |
| 9,869,074 | B2 * | 1/2018 | Andersson | F15B 11/05 | |
| 12,123,172 | B2 * | 10/2024 | Nakajima | E02F 3/435 | |

FOREIGN PATENT DOCUMENTS

| | | | |
|---|---|---|---|
| DE | 102007040877 | A1 | 3/2009 |
| DE | 102017219942 | A1 | 5/2019 |

* cited by examiner

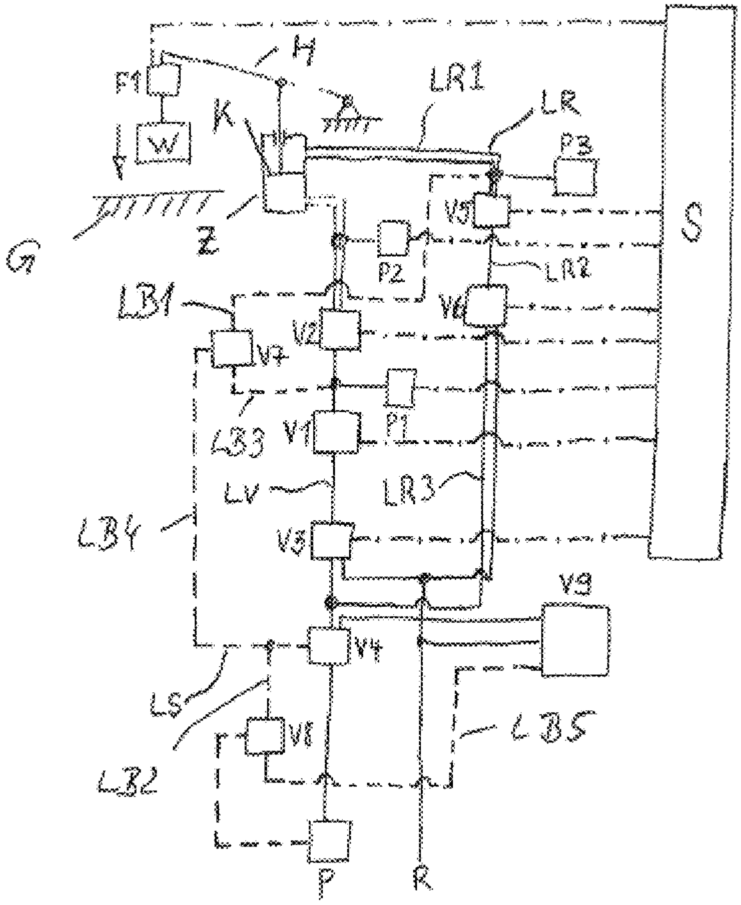
H
F1
W
K
LR1
LR
P3
G
Z
V5
S
P2
LR2
LB1
V6
V2
V7
P1
LB3
V1
LV
LR3
LB4
V3
V9
V4
LS
LB5
V8
LB2
P
R

METHOD FOR HYDRAULICALLY LOWERING TOOLS ONTO A SURFACE OF AN OBJECT

BACKGROUND

The invention relates to a method for hydraulically lowering tools onto a surface of an object. In this context, a tool should be capable of being placed onto the respective surface with a predeterminable force and/or pressure.

Especially in the case of large and heavy tools, such as brushes, shovels or other pressure tools, damage can occur to the respective object onto which a tool is to be lowered. However, damage to the respective tool can also occur if excessive forces or torques act on the tool and/or the object.

This can be counteracted with a very sophisticated sensor system to achieve a controlled lowering motion. However, the individual sensors used are very sensitive, which does not always prove successful in rough everyday operations and can lead to control failures. As already mentioned, hydraulically operated larger machines are operated under a wide variety of difficult operating conditions, so that this problem has an increasingly negative effect in such applications.

SUMMARY

It is therefore an object of the present invention to provide possibilities for a simplified and robust control of larger hydraulically operated machines, with which a control of the lowering motion of a tool onto a surface of an object becomes possible, in which a predetermined force or pressure on the respective surface is not exceeded, and simple hydraulic components with a simple and robust sensor system can be used for this purpose.

According to the invention, this object is attained by a method having the features of the claims. Advantageous embodiments and further developments of the invention can be realized with the features described in the dependent claims.

In the process, hydraulic fluid is routed from a pump via a feed line, in which three valves are interposed in a series arrangement, to a hydraulic cylinder. The hydraulic cylinder raises or lowers a mechanical device, in particular a lever. In this case, a tool is attached to the mechanical device, which is lowered onto a surface of the object during a lowering motion of the piston of the hydraulic cylinder, in which the second valve, which is located in the feed line closest to the hydraulic cylinder, is closed when the piston moves to lower the tool. In this case, the third valve disposed between the pump and the hydraulic cylinder upstream of a first valve disposed upstream of the second valve in the flow direction of the hydraulic fluid for raising the tool, and the first valve are opened so that a first pressure having a predetermined value corresponding to a pressure in the feed line and the cylinder with which the predetermined pressure or force effect with the tool can be exerted on the surface of the object is set between the first valve and the third valve, and when a second pressure in the feed line between the cylinder and the second valve is reduced to a value corresponding to the previously reached first pressure between the third valve and the first valve, the second valve is opened so that the pressure is maintained in the feed line up to the piston inside the hydraulic cylinder at which the predetermined pressure or the predetermined force effect of the tool is exerted on the surface of the object.

However, the predetermined pressure or force effect can also be determined with a force or torque sensor in preliminary tests.

If a differential cylinder is used as the hydraulic cylinder, a third pressure sensor connected in the return line in a first region of the return line can be used in an electronic control system to detect the pressure force in the rod chamber, of the hydraulic cylinder and correct the set pressure so that the force with which the tool acts on the surface of the object corresponds to the predetermined force. This is not necessary when using a single-acting differential cylinder.

In the case of a differential cylinder as a hydraulic cylinder, the process can also be carried out on the rod side or on the piston and rod side of the hydraulic cylinder.

All pressures to be considered can be monitored with the aid of pressure sensors.

The first pressure can be adjusted with the aid of the third valve, which is preferably designed as a proportional valve.

The first pressure in the feed line can be adjusted with the aid of the third valve, which is preferably designed as a proportional valve.

In one embodiment, however, a combination of the first valve with the second valve, or even a combination of the first, second, and third valves in a unit configured to perform the functions of the two or three valves, may be used in place of the individual valves in the feed line.

The rod side of a differential cylinder as a hydraulic cylinder can be pressurized via a fifth valve, which is disposed in a first region of the return line disposed between the hydraulic cylinder and the fifth valve, with a pressure settable by a sixth valve, which is also disposed in the return line in the flow direction of the hydraulic fluid in the return line downstream of the fifth valve, if a settable or constant preload pressure is required on the rod side of the hydraulic cylinder, or/and the pressure sensor P3 is to be omitted, or/and a shut-off in the feed line to the rod side of the hydraulic cylinder is required in the stop mode of the hydraulic cylinder.

Via a seventh valve, which is disposed in a bypass line leading from the feed line between the first valve to the return line with a connection to the return line, which is disposed between the hydraulic cylinder and the fifth valve, a pressure for controlling a fourth valve, which is designed as a priority or pressure balance valve, is decoupled for additional use of further device functions in preferably load-sensing control systems. The fourth valve as a priority valve ensures a preferred pressure oil supply of the described control device compared to other device functions which do not affect the operation of the method according to the invention and concerns functions with which other objects can be realized.

Other device functions, for example, can be additional infeed motions, tool drive or auxiliary functions such as supports, interlocks, etc.

With a load-sensing control system, it is possible to optimize the energy level of the machine and reduce unnecessary energy consumption. The invention is suitable for use with either a variable displacement pump or a fixed displacement pump as a pump.

The pressure for controlling the fourth valve can drive a variable displacement pump with load-sensing control systems directly or via an eighth valve located in a second bypass line between the pump and the seventh valve. In this way, both the volume flow and the pressure that the pump needs to apply can be adapted to the actual requirements.

Instead of a variable displacement pump, however, a fixed displacement pump that delivers a constant volume flow can also be used, in which case only the required pressure can be adapted to the maximum necessary requirements in each case via the fourth valve.

To control or monitor the force with which the tool acts on the surface of the object, a force sensor can be used which can measure directly on the tool or also on the mechanical device.

With the method according to the invention, the lowering of a tool can thus be automatically controlled without the need for a highly sophisticated sensor system.

In the following, the invention will be explained in more detail by way of example.

In the drawings:

FIG. 1 shows a schematic hydraulic circuit diagram of an example of an hydraulic system with which the method according to the invention can be carried out.

In the example shown, starting from a pump P, hydraulic fluid is delivered to the hydraulic cylinder Z via the feed line LV. The rod of the hydraulic cylinder Z can thus be moved and raised or lowered with respect to the surface of an object G by means of the lever H, as an example of a mechanical device of the tool W. Hydraulic fluid can be delivered from the rod side of the hydraulic cylinder Z via the return line with the regions LR1, LR2 and LR3 into the feed line LV or can be delivered back via a return line R.

In this example, four valves V1 to V4 are connected in the feed line LV, which are connected to the electronic control system S. The valves V1 to V4 are opened or closed by the electronic control system S depending on the pressures p1 and p2 measured with the aid of the pressure sensors P1 and P2 in the feed line LV, as it has been explained in the general part of the description.

Here, the first pressure p1 is measured with the aid of the pressure sensor P1 between the first valve V1, which is disposed upstream of the second valve V2 in the flow direction to the hydraulic cylinder Z, and the second pressure p2 is measured with the aid of the pressure sensor P2, which is disposed between the second valve V2 and the hydraulic cylinder Z.

A bypass line LB1 is routed from the first region LR1 of the return line, which is disposed between the hydraulic cylinder Z and a fifth valve V5, and a bypass line LB3 is routed from the feed line LV to the seventh valve V7 or a valve combination V7 with an OR function. Depending on the direction of motion of piston K in the hydraulic cylinder Z or the pressures p1 and p3, the seventh valve V7 directs the pressure required in each case into a bypass line LB4. The bypass pressure in line LB4 controls a fourth valve V4 for giving priority to the hydraulic fluid supply of the controlled hydraulic cylinder Z independent of the load.

If an active pressure is required in the rod side in the hydraulic cylinder Z, a sixth valve V6 is provided in a second region LR2 of the return line LR, which is used to adjust the pressure in region LR2 of the return line. If it is necessary to shut off the flow of hydraulic fluid to the rod side of the hydraulic cylinder Z, another fifth valve V5 is disposed between the first region LR1 and the second region LR2 of the return line and allows hydraulic fluid at increased pressure into the rod side of the hydraulic cylinder or shuts off this flow into the hydraulic cylinder Z. The fifth and/or sixth valve V5 and/or V6 can also be omitted. If the fifth valve V5 is omitted, there is no shut-off of the hydraulic cylinder Z and if the sixth valve V6 is omitted, there is no application of a constant pressure in the hydraulic cylinder on its rod side.

If both valves V5 and V6 are omitted, hydraulic fluid is returned from hydraulic cylinder Z directly to the return line.

Another possibility that arises in this example can be achieved with the third valve V3 closed and with the fourth valve V4 open, which is disposed in the feed line LV upstream of the third valve V3 in the flow direction. With appropriate setting of the fourth valve V4, hydraulic fluid from a third region LR3 of the return line, which is disposed downstream of the sixth valve V6 in the flow direction of the hydraulic fluid, reaches the seventh valve V7 via a fourth bypass line LB4, so that, with appropriate switching position of the seventh valve V7, it is possible to allow hydraulic fluid to flow again either into the feed line LV or the return line, preferably into the third region LR3. This can be achieved depending on the pressure in the feed line LV measured with the aid of the first pressure sensor P1 and the second pressure sensor P2 and the pressure in the line LS in the fourth bypass line LB4.

In this example, a ninth valve or valve combination V9 is connected to the fourth valve V4 and the return line, with which hydraulic fluid can be directed via the supply line for further hydraulic functions. A pressure in the bypass line LB5 provided via the ninth valve/valve combination V9 can be used to provide a bypass pressure to control the pump P via another eighth valve V8.

All valves V1 to V9 as well as pressure sensors P1, P2 and P3 should be connected to the electronic control system S, which is used to control the volume flow rates in all lines and, in particular, to control the pressure in the hydraulic cylinder Z depending on the specified force F1 with which the tool W is to be lowered onto the surface of the object G or another function is to be performed. The valves V6, V7, V8, V4 are not necessarily connected to the control system S in this case.

The invention claimed is:

1. A method for hydraulically lowering tools onto a surface of an object with predeterminable force and/or predeterminable pressure, in which hydraulic fluid is fed from a pump via a feed line, in which three valves are interposed in a series arrangement, to a hydraulic cylinder, and the hydraulic cylinder raises and lowers a mechanical device comprising a lever, wherein a tool is attached to the mechanical device, which tool is lowered onto a surface of the object during a lowering motion of the piston of the hydraulic cylinder by closing a second valve, which is disposed in the feed line closest to the hydraulic cylinder, when the piston is to be moved for lowering the tool, wherein a third valve, which is disposed between the pump and the hydraulic cylinder upstream of a first valve, which is disposed upstream of the second valve in the flow direction of the hydraulic fluid for raising the tool, and the first valve are opened so that between the first valve and the third valve, a first pressure is set with a predetermined value corresponding to a pressure in the feed line and the hydraulic cylinder at which the predetermined pressure or force effect can be exerted by means of the tool on the surface of the object, and when a second pressure in the feed line between the hydraulic cylinder and the second valve is reduced to a value corresponding to the previously reached first pressure between the third valve and the first valve, the second valve is opened so that in the feed line up to the piston inside the hydraulic cylinder, the pressure is maintained at which the predetermined pressure or force effect of the tool is exerted on the surface of the object.

2. The method according to claim 1, characterized in that when using the hydraulic cylinder with a pressure sensor connected in a return line, the pressure force in the rod chamber of the hydraulic cylinder is detected in an electronic control system and the set pressure in the hydraulic cylinder is corrected so that the force at which the tool acts on the surface of the object corresponds to the predetermined force.

3. The method according to claim 1, characterized in that in the case of a differential cylinder as the hydraulic cylinder with a pressure sensor connected in a return line, the pressure force on a piston or piston and rod side of the hydraulic cylinder is detected in an electronic control system and the set pressure in the hydraulic cylinder is corrected in such a way that the force by means of which the tool acts on the surface of the object corresponds to the predetermined force.

4. The method according to claim 1, characterized in that the pressures are monitored with the aid of pressure sensors.

5. The method according to claim 1, characterized in that the first pressure is set with the third valve, which is designed as a proportional valve.

6. The method according to claim 1, characterized in that a rod side of a differential cylinder, as the hydraulic cylinder is acted upon via a fifth valve, which is disposed in an region of the return line, with a pressure settable by means of a sixth valve, which is disposed at the region of the return line in the flow direction of the hydraulic fluid downstream of the fifth valve.

7. The method according to claim 1, characterized in that via a seventh valve, which is disposed in a bypass line leading from the feed line between the first valve to a first region of the return line, which is disposed between the hydraulic cylinder and the fifth valve, a pressure for controlling a fourth valve, which is designed as a priority or pressure balance valve, is decoupled for additional use of further device functions in load-sensing control systems.

8. The method according to claim 1, characterized in that a fixed displacement pump is used as the pump.

9. The method according to claim 7, characterized in that the pressure for controlling the fourth valve controls a variable displacement pump as the pump in load-sensing control systems directly or via an eighth valve, which is disposed in a second bypass line between the pump and the seventh valve.

10. The method according to claim 1, characterized in that a force sensor is used to control or monitor the force by means of which the tool acts on the surface of the object.

* * * * *